(12) United States Patent
Martin

(10) Patent No.: US 6,675,913 B2
(45) Date of Patent: Jan. 13, 2004

(54) CORE DRILLING METHOD AND APPARATUS

(76) Inventor: Wilfred R. Martin, 401 B Ritchie Rd., Capitol Heights, MD (US) 20743

( * ) Notice: Subject to any disclaimer, the term of this patent is extended or adjusted under 35 U.S.C. 154(b) by 17 days.

(21) Appl. No.: 10/208,088

(22) Filed: Jul. 30, 2002

(65) Prior Publication Data

US 2003/0221868 A1 Dec. 4, 2003

Related U.S. Application Data

(60) Provisional application No. 60/385,712, filed on Jun. 4, 2002.

(51) Int. Cl.$^7$ ............................................... E21B 1/00
(52) U.S. Cl. ........................................... 175/20; 173/53
(58) Field of Search ............................. 175/19, 20, 55, 175/56, 135, 293, 299, 403, 407; 173/53

(56) References Cited

U.S. PATENT DOCUMENTS

| 282,382 | A | | 7/1883 | Shedlock | |
|---|---|---|---|---|---|
| 719,882 | A | | 2/1903 | Scales | |
| 1,048,841 | A | | 12/1912 | Locke | |
| 3,968,845 | A | * | 7/1976 | Chaffin | 175/60 |
| 4,161,988 | A | * | 7/1979 | Hart | 173/32 |
| 5,082,068 | A | * | 1/1992 | Cornell | 173/189 |
| 5,213,169 | A | * | 5/1993 | Heller | 175/122 |
| 5,672,044 | A | | 9/1997 | Lemelson | |
| 6,085,850 | A | | 7/2000 | Phillips | |
| 6,315,059 | B1 | | 11/2001 | Geldean | |

* cited by examiner

Primary Examiner—Frank Tsay
(74) Attorney, Agent, or Firm—Roberts Abokhair & Mardula, LLC

(57) ABSTRACT

A method and apparatus for core drilling of concrete by resiliently mounting a hammer drill to a drill press or similar support frame using a recoil spring to maintain a driving force on the hammer drill. An air blower is positioned adjacent the core drilling bit to provide cooling of the bit and material removal from the core such that the bit no longer needs to be periodically withdrawn from the core for material removal. In a preferred embodiment, the support frame uses a screw jack to periodically move the resiliently mounted hammer drill. Use of an inexpensive electric blower and electric hammer drill allow semi-automatic remote operation, wherein the screw jack is turned to compress the recoil spring and then the blower and hammer drill are turned on from a remote distance by switching the electricity on. In this manner, the operator can operate the core drilling system without being subjected to the concrete dust and debris being blown from the core by the blower.

15 Claims, 3 Drawing Sheets

CORE DRILLING METHOD AND APPARATUS

RELATIONSHIP TO PRIOR APPLICATIONS

This application claims the benefit of U.S. Provisional Application Ser. No. 60/385,712, filed Jun. 4, 2002 and hereby incorporated by reference in its entirety.

BACKGROUND OF THE INVENTION

Core drilling of concrete is often performed using an appropriate core drilling bit in a hammer drill. However, only a limited depth can be obtained before the bit must be withdrawn to allow clearing of material from the core. A few rig-mounted systems employ a vacuum to handle dust and debris. The process is relatively slow and labor intensive. More complicated core drilling systems exist that employ water to cool the bit and remove some of the loose material from the core, but these systems require specialized "wet" drills for feeding water into the bit and are expensive and not easily used in remote locations due to the need for water. What would be useful is an inexpensive, transportable system to perform core drilling quicker with less effort.

The present invention is drawn to a core drilling method and apparatus for concrete, and more particularly to a semi-automatic method and apparatus for mounting an ordinary hammer drill and an air blower to a transportable support frame, wherein a recoil spring or similar resilient member is mounted between the hammer drill and a jack member fixed to the support frame.

In another embodiment, the system can be made completely automatic by incorporating a jack drive means and a limit switch.

BRIEF SUMMARY OF THE INVENTION

The present invention provides an improved method and apparatus for core drilling of concrete by resiliently mounting a hammer drill to a drill press (or similar support frame) using a recoil spring to maintain a driving force on the hammer drill. An air blower is positioned adjacent the core drilling bit to provide cooling and material removal from the core such that the bit no longer needs to be periodically withdrawn from the core for material removal.

It is another embodiment, the support frame uses a screw jack to periodically move the resiliently mounted hammer drill. Use of an inexpensive electric blower and electric hammer drill allow semi-automatic remote operation, wherein the screw jack is turned to compress the recoil spring and then the blower and hammer drill are turned on from a remote distance by switching the electricity on. In this manner, the operator can operate the core drilling system without being subjected to the concrete dust and debris being blown from the core by the blower.

DETAILED DESCRIPTION OF THE INVENTION

Figure 1:
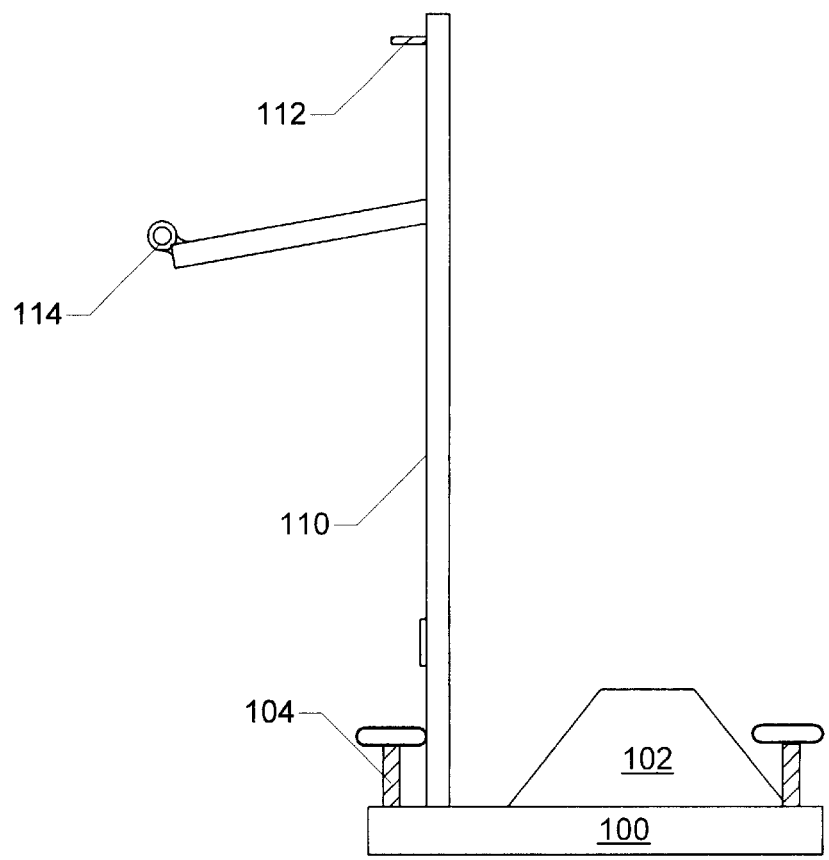
FIG. 1 illustrates side view a portable support frame in accordance with the present invention.
Figure 2:
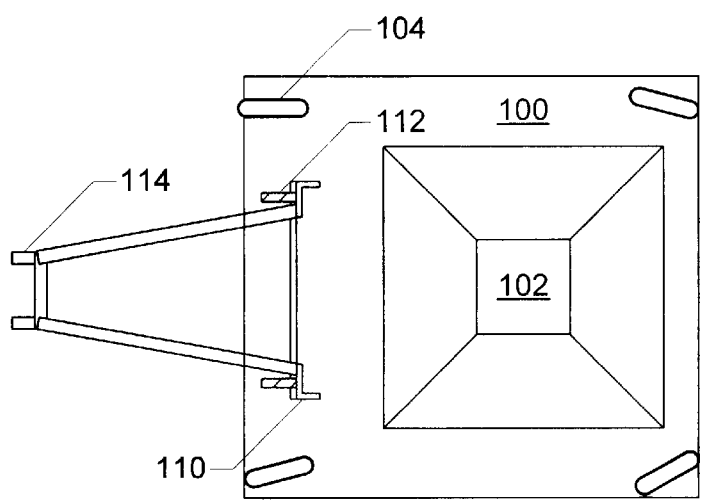
FIG. 2 illustrates a top view a portable support frame in accordance with the present invention.

To allow the present invention to have suitable portability, it utilizes a support frame that can be easily transported to the remote work site. As illustrated in FIGS. 1–2, a portable support frame in accordance with the present invention includes a base 100 and a vertical support structure 110. The base 100 is comprised of a horizontal member having sufficient area to support a suitably heavy weight 102 to stabilize the assembly. The base 100 preferably includes a plurality of jack members 104 at the corners to level the assembly or otherwise adjust it to the desired core drilling angle.

The vertical support structure 110 includes attachment points 112, 114 for mounting both the hammer drill and the air blower in positions suitable for placing the hammer drill assembly adjacent the concrete and the air blower adjacent to the interface of the hammer drill assembly and the concrete.

Figure 3:
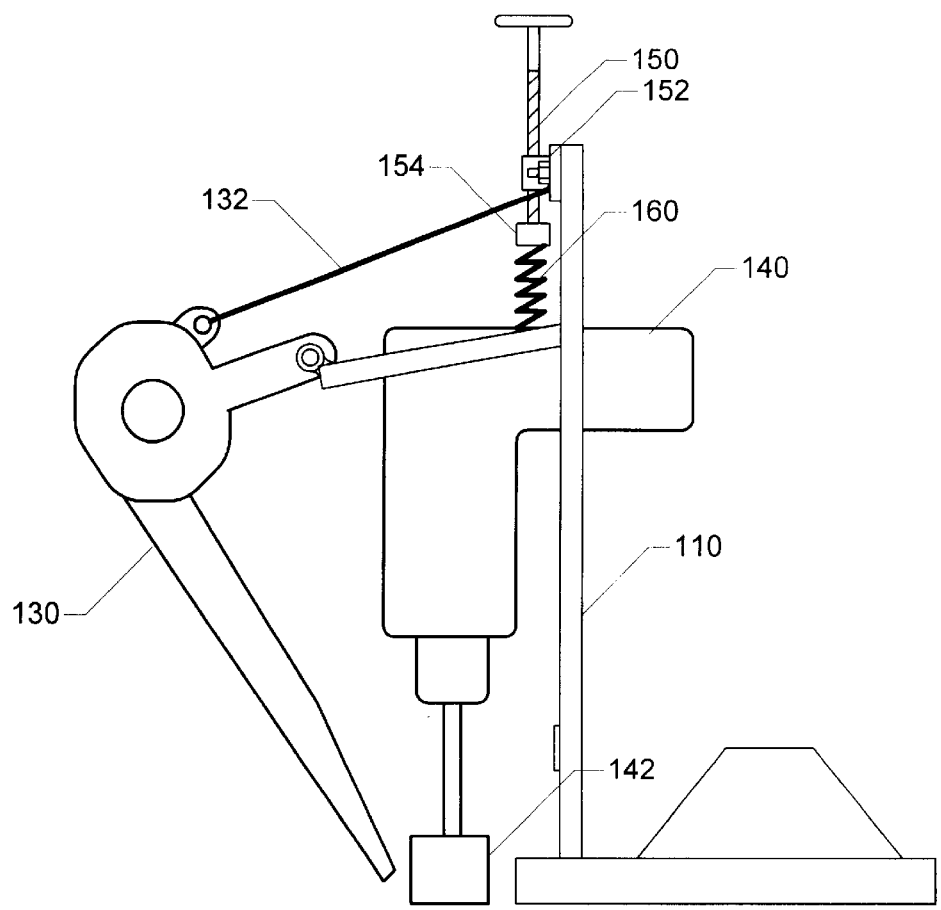
FIG. 3 illustrates a side view of a blower and hammer drill assembly in accordance with the present invention.
Figure 4:
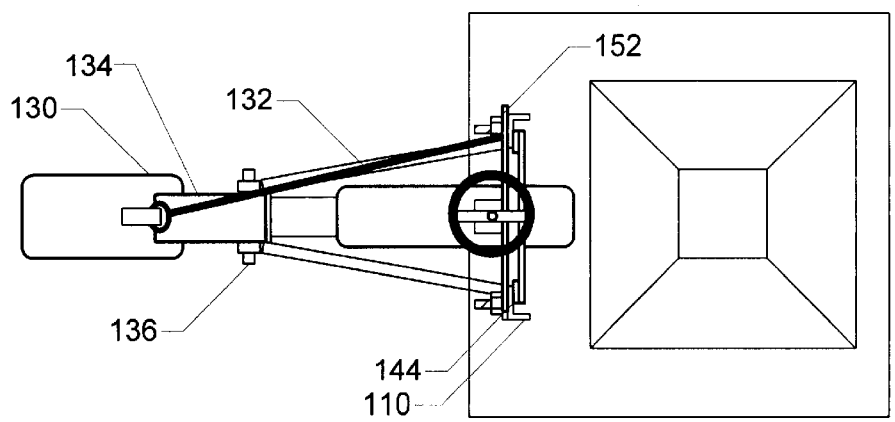
FIG. 4 illustrates a top view of a blower and hammer drill assembly in accordance with the present invention.

A typical embodiment of the hammer drill assembly of the present invention is illustrated in FIGS. 3–4. The assembly includes means 144 attached vertically to the hammer drill 140 to engage the vertical support structure 100 in a manner to allow the vertical movement of the hammer drill 140, which in the present embodiment is a pair of plates for engaging matching surfaces on the vertical support structure 110. A resilient member 160 to provide a vertical force to the hammer drill 140 is positioned opposite the core drill bit 142. In the present embodiment, this is accomplished using an appropriate strength coil spring rigidly attached to the handle of the hammer drill 140. The other end of the resilient member or spring is coupled to a screw jack 150 in a manner, such as bearing 154, allowing free rotation to eliminate any torsional forces from the rotation of the screw jack 150 from being further transmitted to the spring. The fixed, threaded screw hole of the screw jack 150 is mounted on a cross member 152 that is rigidly secured to the support frame 110.

In the illustrated embodiment, a pair of threaded studs 112 at an appropriate height on the vertical support structure 110 are used to engage matching holes on the cross member 152 of the hammer drill assembly that supports the threaded screw hole of the screw jack 150. The air blower 130 is attached to a suitably located and configured support structure 114 on the support frame by means such as a pin 136 through a hole in hand-grip 134 of the blower 130 and a strap or chain 132. In the illustrated embodiment, the blower 130, such as the $39.00 Power Sweep™ (model 51586) available from the Toro Company, Consumer Division, 8111 Lyndale Avenue South, Bloomington, Minn. 55420, has its handle modified for attachment to the support frame by inclusion of a through-hole in the hand-grip 134 and a hose-clamp or other means on the hand-grip or body for engaging a strap or chain 132. The air blower 130 is rotationally mounted to the support frame using a bolt or pin 136 engaging the through-hole in the hand-grip 134. The chain 132 is then attached to the hose-clamp or other means so as to position the air blower at an angle suitable to blow loose material out of the core during core drilling.

As illustrated, a coil spring 160 used as the resilient mount for the present invention. The spring 160 acts as a recoil spring for the hammer drill 140 during the core drilling and is selected with a spring rate to provide a suitable force for the core drilling operation due to compression provided by the jack screw 150.

In operation, the jack screw 150 is turned to provide compression to the spring 160 that, in turn, provides core drilling force to the hammer drill 140. The disclosed system can be operated in various modes. In a first mode, an operator with suitable protection from dust and debris can actuate the hammer drill 140 and the air blower 130 and progressively crank the screw jack 150 until the desired core drilling has been completed.

In a semi-automatic mode, the operator without protective equipment can compress the spring 160 with the screw jack 150, move to a safe distance, and then actuate the hammer drill 140 and air blower 130 until the spring 160 is no longer compressed. The operator then turns off the hammer drill 140 and blower 130 and repeats the process until the core drilling is completed.

Figure 5:
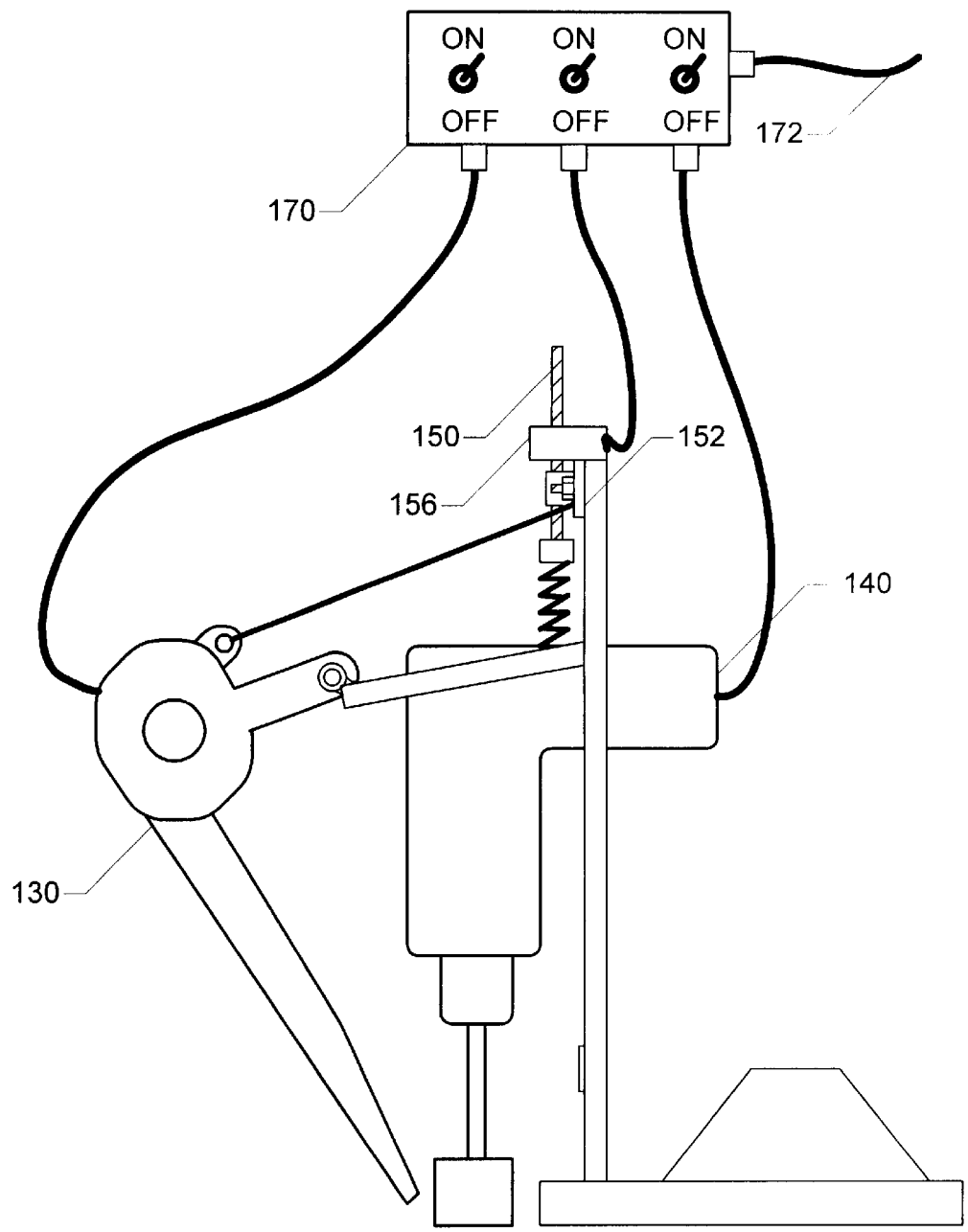
FIG. 5 illustrates a remotely operated embodiment of the present invention.

In a fully automatic mode, illustrated in FIG. 5, a motor or other means 154 is supplied to turn the screw jack 150 and all operations are done remotely by power-control switches 170. A limit switch (included in means 156 or elsewhere) or other suitable means can optionally be used to detect the when the desired core drilling depth has been achieved in order to automatically stop the core drilling, such as by switching off the power 172 at 170.

As used herein, the term "hammer drill" refers to impact-type drills that do not include means for handling water. Although the term concrete has been used herein, the invention suitable for virtually any core drilling with an impact-type drill and is therefore not limited to core drilling of concrete. It includes, but is not limited to, core drilling of concrete, reinforced concrete, brick, block and stone.

Additionally, although the terms vertical and horizontal have been used herein, they are relative terms used to describe the common vertical core drilling of the invention, which is not limited to vertical use, but which also has additional utility at other angles.

The preferred embodiment uses an electric hammer drill and electric air blower since these items are low cost and require only electricity, which is commonly available through either AC outlets or portable generators. However, the invention is not meant to be so limited and may use other types of components where practical, such as pneumatic devices where a ready source of compressed air is already available.

Furthermore, although a coil-type recoil spring and a screw-operated jack mechanism have been disclosed, the invention is not meant to be limited to these devices and can use other types of springs, including but not limited to: flat/leaf springs, torsion springs, air/gas springs, and stacked Belleville springs and can use other types of jack-mechanisms, including but not limited to: hydraulic jacks, rack-and-lever jacks, and rack-and-pinion mechanisms.

Additionally, one of ordinary skill in the art will recognize that the addition of a vacuum means for handling dust may be desirable and that numerous other variations of suitable support frames are possible without departing from the scope of the present invention.

I claim:

1. A method of core drilling, comprising:
   mounting a hammer drill and core bit in a position for core drilling;
   supplying a drilling force by compression of a resilient means attached to said hammer drill;
   positioning an air blower adjacent said core bit; and
   operating said hammer drill and blower simultaneously to perform core drilling.

2. The method of claim 1, further comprising mounting said hammer drill and said air blower on a support frame.

3. The method of claim 2, further comprising mounting said hammer drill to said support frame via a jack means that is connected to said resilient means opposite said hammer drill, wherein said jack means is used to supply compression of said resilient means.

4. The method of claim 1, further comprising operating said hammer drill and blower from a remote location.

5. The method of claim 4, further comprising operating said jack means from a remote location.

6. A core drilling apparatus comprising:
   means to position a hammer drill and core bit for core drilling;
   means to supply a drilling force by compression of a resilient means attached to said hammer drill; and
   means to position an air blower adjacent said core bit.

7. The apparatus of claim 6, wherein a support frame acts as said means to position said hammer drill and means to position said air blower.

8. The apparatus of claim 7, further comprising mounting said hammer drill to said support frame via a jack means attached to an opposite end of said resilient means.

9. The apparatus of claim 8, wherein said jack means is a jack screw.

10. The apparatus of claim 8 wherein said resilient means is a spring.

11. The apparatus of claim 7, wherein said support frame further includes a plurality of jack screws at a periphery of a base portion of the support frame to adjust the level thereof.

12. A core drilling frame, comprising:
    a base;
    an opening in said base for core drilling;
    a perpendicular support;
    said support including a first support means adapted to position a hammer drill assembly for core drilling and a second support means adapted to position an air blower adjacent said core drilling.

13. The core drilling frame of claim 12, further comprising a plurality of jack screws at a periphery of said base for leveling said base.

14. The core drilling frame of claim 12, wherein said first support means comprises a pair of vertical supports having threaded studs at an upper portion thereof.

15. The core drilling frame of claim 14, wherein said second support means comprises a pair of substantially horizontal supports extending from said vertical supports and a means adapted to support an air blower to allow rotation thereof.

* * * * *